(12) United States Patent
Gillott

(10) Patent No.: US 11,460,597 B2
(45) Date of Patent: *Oct. 4, 2022

(54) INTERLEAVED MARINE DIFFRACTION SURVEY

(71) Applicant: Magseis FF LLC, Houston, TX (US)

(72) Inventor: Graham Gillott, Houston, TX (US)

(73) Assignee: Magseis FF LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,762

(22) Filed: May 18, 2021

(65) Prior Publication Data
US 2021/0270986 A1 Sep. 2, 2021

Related U.S. Application Data

(63) Continuation of application No. 16/446,383, filed on Jun. 19, 2019, now Pat. No. 11,035,970.

(51) Int. Cl.
*G01V 1/38* (2006.01)
*B63B 21/56* (2006.01)

(52) U.S. Cl.
CPC ............ *G01V 1/3808* (2013.01); *B63B 21/56* (2013.01); *B63B 2211/02* (2013.01); *G01V 2210/1293* (2013.01); *G01V 2210/1423* (2013.01); *G01V 2210/64* (2013.01)

(58) Field of Classification Search
CPC ......... G01V 1/3808; G01V 2210/1293; G01V 2210/1423; G01V 10/64; B63B 21/56; B63B 2211/02
See application file for complete search history.

(56) References Cited

U.S. PATENT DOCUMENTS

| 3,278,893 A | 10/1966 | Silverman |
| 4,405,999 A | 9/1983 | Zachariadis |
| 5,973,995 A | 10/1999 | Walker et al. |
| 6,285,956 B1 | 9/2001 | Bennett et al. |
| 6,590,831 B1 | 7/2003 | Bennett et al. |

(Continued)

FOREIGN PATENT DOCUMENTS

| GB | 2 559 845 A | 8/2018 |
| WO | WO-2018/067016 A1 | 4/2018 |

OTHER PUBLICATIONS

International Search Report and Written Opinion for PCT/US2019/047244 dated Mar. 2, 2020 (12 pages).

*Primary Examiner* — Chico A Foxx
(74) *Attorney, Agent, or Firm* — Sage Patent Group

(57) ABSTRACT

A seabed object detection system is provided. The system can include a receiver array. The receiver array can include a plurality of receivers disposed on a plurality of streamers. The plurality of streamers can include a central port side streamer, a central starboard side streamer, an auxiliary port side streamer and an auxiliary starboard side streamer. The system can include a source array. The source array can include a plurality of sources. The plurality of sources can include a central port side source, a central starboard side source, an auxiliary port side source, and an auxiliary port side streamer. The source array towed during a first pass can define a first path. The source array towed during a second pass can define a second path. The first path can be interleaved with the second path such that the first path overlaps the second path.

20 Claims, 7 Drawing Sheets

(56) References Cited

U.S. PATENT DOCUMENTS

| | | |
|---|---|---|
| 10,429,505 B2 | 10/2019 | Steenstrup et al. |
| 2006/0227657 A1 | 10/2006 | Tveide et al. |
| 2006/0291328 A1 | 12/2006 | Robertsson et al. |
| 2007/0165486 A1* | 7/2007 | Moldoveanu ............ G01V 1/38 367/15 |
| 2008/0019215 A1* | 1/2008 | Robertsson ............ G01V 1/308 367/19 |
| 2008/0267010 A1* | 10/2008 | Moldoveau .............. G01V 1/38 367/16 |
| 2009/0067285 A1 | 3/2009 | Robertsson et al. |
| 2009/0296520 A1 | 12/2009 | Keers et al. |
| 2010/0329078 A1 | 12/2010 | Christie |
| 2012/0072115 A1 | 3/2012 | Laws |
| 2012/0314536 A1 | 12/2012 | Bagaini |
| 2013/0028050 A1 | 1/2013 | Ozdemir et al. |
| 2013/0100764 A1 | 4/2013 | Ruet |
| 2013/0135966 A1 | 5/2013 | Rommel et al. |
| 2013/0170316 A1 | 7/2013 | Mandroux |
| 2013/0208564 A1 | 8/2013 | Ni et al. |
| 2013/0322205 A1 | 12/2013 | Widmaier et al. |
| 2013/0333974 A1* | 12/2013 | Coste .................. G01V 1/3808 181/119 |
| 2014/0064027 A1 | 3/2014 | Winnett |
| 2014/0081576 A1 | 3/2014 | Grenie et al. |
| 2014/0140171 A1 | 5/2014 | Sollner |
| 2014/0369162 A1* | 12/2014 | Teyssandier ......... G01V 1/3861 367/14 |
| 2015/0003196 A1 | 1/2015 | Hegna |
| 2015/0346365 A1 | 12/2015 | Desrues |
| 2016/0109600 A1 | 4/2016 | Mensch et al. |
| 2016/0170059 A1 | 6/2016 | Ramos-Martinez et al. |
| 2016/0202377 A1 | 7/2016 | Boberg et al. |
| 2016/0313466 A1 | 10/2016 | Grenie et al. |
| 2016/0327670 A1 | 11/2016 | Wang et al. |
| 2017/0059732 A1 | 3/2017 | Bjornemo |
| 2017/0115416 A1 | 4/2017 | Van Groenestijn |
| 2017/0168182 A1 | 6/2017 | Long |
| 2017/0199292 A1 | 7/2017 | Tonnessen et al. |
| 2017/0276774 A1* | 9/2017 | Nl ....................... G01S 15/8902 |
| 2018/0001977 A1 | 1/2018 | Toennessen |
| 2018/0259666 A1 | 9/2018 | Siliqi et al. |
| 2018/0267188 A1 | 9/2018 | Turquais et al. |
| 2018/0321406 A1 | 11/2018 | Strand et al. |
| 2019/0113645 A1* | 4/2019 | Hegna .................. G01V 1/3826 |
| 2019/0120987 A1* | 4/2019 | Söllner ................ G01V 1/3817 |
| 2019/0187317 A1 | 6/2019 | Watts et al. |

\* cited by examiner

INTERLEAVED MARINE DIFFRACTION SURVEY

CROSS-REFERENCE TO RELATED APPLICATIONS

This application claims the benefit of priority under 35 U.S.C. § 120 as a continuation of U.S. patent application Ser. No. 16/446,383, filed Jun. 19, 2019, which is hereby incorporated by reference herein in its entirety.

BACKGROUND

Seismic or other operations performed on a piece of earth can identify subterranean characteristics or features of the analyzed piece of earth.

SUMMARY

At least one aspect of the present disclosure is directed to a seabed object detection system which can include a receiver array. The receiver array can include a plurality of receivers. The plurality of receivers can be disposed on a plurality of streamers. The plurality of streamers can include a central pair of streamers. The central pair of streamers can include a central port side streamer and a central starboard side streamer. The plurality of streamers can include at least one auxiliary port side streamer located a first distance from the central pair of streamers. The plurality of streamers can include at least one auxiliary starboard side streamer located a second distance from the central pair of streamers opposite the at least one auxiliary port side streamer. The seabed object detection system can include a source array which can include a plurality of sources. The plurality of sources can include at least one central pair of sources. The at least one central pair of sources can include a central port side source and a central starboard side source. The central pair of sources can be located between the central pair of streamers. The plurality of sources can include at least one auxiliary port side source. The at least one auxiliary port side source can be located between the central port side streamer and the at least one auxiliary port side streamer. The plurality of sources can include at least one auxiliary starboard side source. The at least one auxiliary starboard side source can be located between the central starboard side streamer and the at least one auxiliary starboard side streamer. The source array towed as part of a first pass can define a first path. The source array towed as part of a second pass can define a second path. The first path can be interleaved with the second path such that the first path partially overlaps the second path.

At least one aspect of the present disclosure is direct to a method of seabed object detection. The method can include providing a receiver array. The receiver array can include a plurality of receivers. The plurality of receivers can be disposed on a plurality of streamers. The plurality of streamers can include a central pair of streamers. The central pair of streamers can include a central port side streamer and a central starboard side streamer. The plurality of streamers can include at least one auxiliary port side streamer located a first distance from the central pair of streamers. The plurality of streamers can include at least one auxiliary starboard side streamer located a second distance from the central pair of streamers opposite the at least one auxiliary port side streamer. The method can include providing a source array. The source array can include a plurality of sources. The source array towed during a first pass can define a first path. The source array towed during a second pass can define a second path. The first path can be interleaved with the second path such that the first path partially overlaps the second path. The plurality of source can include at least one central pair of sources. The at least one central pair of sources can include a central port side source and a central starboard side source. The at least one central pair of sources can be located between the central pair of streamers. The plurality of sources can include at least one auxiliary port side source. The at least one auxiliary port side source can be located between the central port side streamer and the at least one auxiliary port side streamer. The plurality of sources can include at least one auxiliary starboard side source. The at least one auxiliary starboard side source can be located between the central starboard side streamer and the at least one auxiliary starboard side streamer.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Reflection-based surveys can obtain information relating to subsurface features. An acoustic signal can reflect off subsurface lithological formations and be acquired, analyzed and interpreted. However, reflection-based surveys typically cover a narrow area and collect a sparse set of data, both of which are factors that contribute to an increased time required to complete the surveys. Additionally, small shallow objects such as boulders buried in the seabed may be difficult to precisely image due to the resolution capabilities of reflection-based surveys. These small objects can complicate or delay wind turbine, marine or ocean bottom constructions that are fixed to the seabed, as well as the placement of cable connections and communication lines between these wind turbine, marine or ocean bottom constructions.

The present disclosure is directed to systems and methods for seabed object detection. Due to the limitations of reflection-based surveys, it can be challenging to detect small shallow objects in the seabed. Inefficiencies related to increased survey time, such as a greater risk of weather-based delays, can increase the operating cost of these surveys without providing an accurate map of obstacles in the seabed. Systems and methods of the present disclosure can solve these and other problems associated with performing a survey to detect seabed objects.

The present disclosure is directed to systems and methods for seabed object detection. For example, the seabed object detection system can provide an accurate map of obstacles in the seabed in an efficient and timely manner. The system can include a receiver array. The receiver array can include a plurality of receivers disposed on a plurality of streamers. The plurality of streamers can include a central port side streamer, a central starboard side streamer, an auxiliary port side streamer and an auxiliary starboard side streamer. The system can include a source array. The source array can include a plurality of sources. The plurality of sources can include a central port side source, a central starboard side source, an auxiliary port side source, and an auxiliary port side streamer. The source array towed during a first pass can define a first path. The source array towed during a second pass can define a second path. The first path can be interleaved with the second path such that the first path overlaps the second path.

Figure 1:
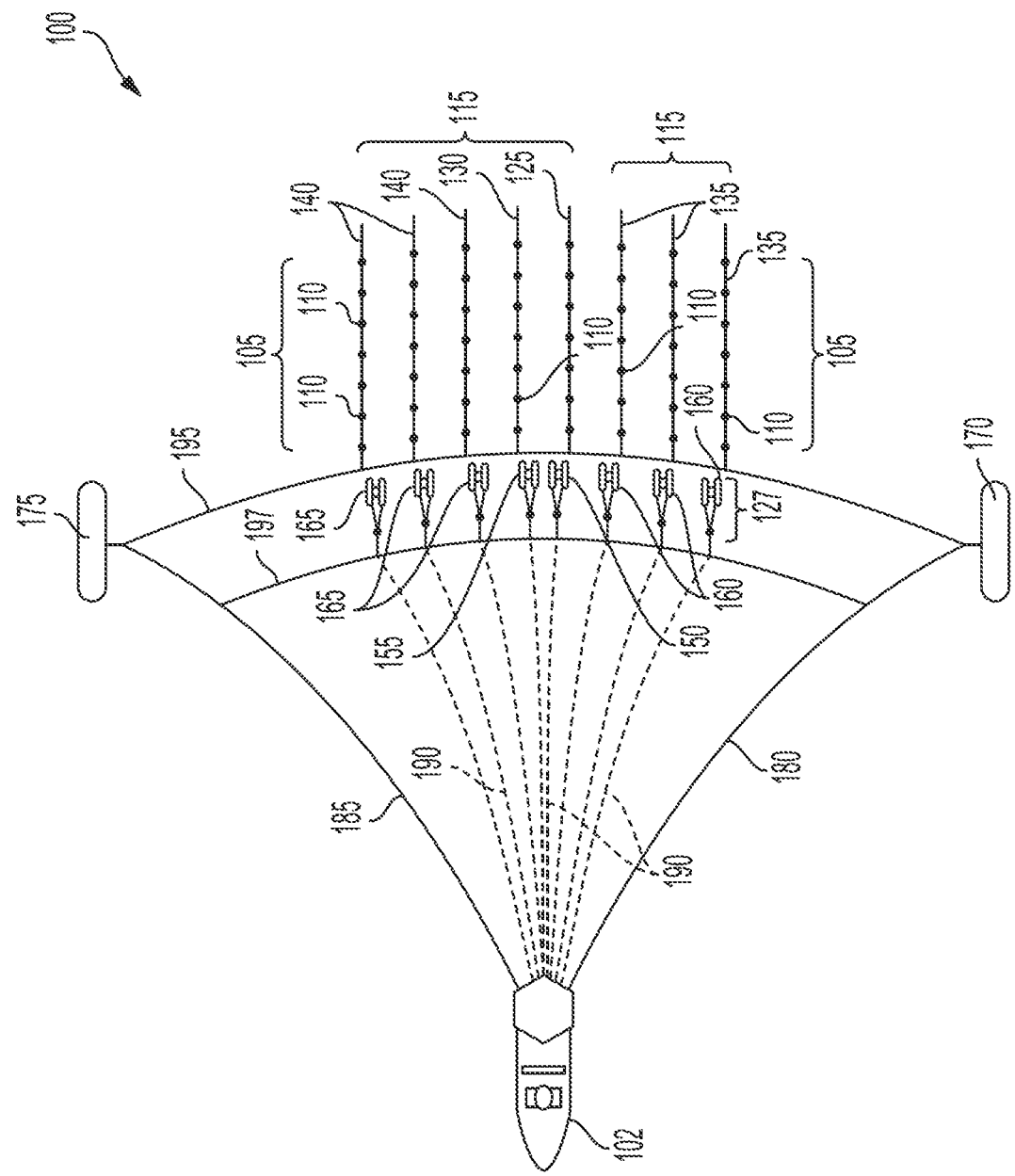
FIG. 1 illustrates a seabed object detection system according to an example implementation.

FIG. 1 illustrates a seabed object detection system 100. FIG. 1 is an example of a marine environment in which the systems and methods of the present disclosure can perform a seismic survey to detect seabed objects. The seabed object detection system 100 can include a receiver array 105. The receiver array 105 can include a plurality of receivers 110. The plurality of receivers 110 can be disposed on a plurality of streamers 115. A streamer of the plurality of streamers 115 may be a cable (e.g., a surface marine cable), an assembly of wires, or any component capable of connecting a receiver to a recording device which may be located on a vessel 102. The receiver array 105 can include one or more receivers. For example, the receiver array 105 can include a plurality of receivers 110 coupled to a plurality of streamers 115. The receiver array 105 can include a pattern of receivers. For example, the plurality of receivers 110 can be coupled to the plurality of streamers 115 along a line. The plurality of receivers 110 of the receiver array 105 can be coupled to the plurality of streamers 115 in a grid pattern. The receiver array 105 can be the pattern formed by the plurality of receivers 110 disposed on the plurality of streamers 115. For example, the receiver array 105 can include a plurality of receivers 110 disposed along a streamer of the plurality of streamers 115. The receiver array 105 can include a plurality of receivers 110 disposed on multiple streamers of the plurality of streamers 115. The receiver array 105 can receive diffraction data diffracted off an object in the seabed.

The receiver array 105 can include a plurality of receivers 110. The plurality of receivers 110 can receive diffraction data diffracted off an object in a seabed. For example, a receiver of the plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The plurality of receivers 110 can be configured to detect acoustic waves that are reflected by seabed objects. The plurality of receivers 110 can be configured to detect acoustic waves that are diffracted by seabed objects. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures. The seabed objects can be completely buried within the seabed. The seabed objects can be partially buried within the seabed.

The plurality of streamers 115 can include a central pair of streamers. The central pair of streamers can include a central port side streamer 125 and a central starboard side streamer 130. The central port side streamer 125 may be a cable (e.g., a surface marine cable), an assembly of wires, or any component capable of connecting a receiver to a recording device which may be located on the vessel 102. The recording device can receive data, such as reflection and diffraction data, from the plurality of receivers 110 disposed on the plurality of streamers 115. The central port side streamer 125 may be disposed on a port side of the vessel 102. The central starboard side streamer 130 may be a cable (e.g., a surface marine cable), an assembly of wires, or any component capable of connecting a receiver to a recording device which may be located on the vessel 102. The central starboard side streamer 130 may be disposed on a starboard side of the vessel 102.

The plurality of streamers 115 can include an auxiliary port side streamer 135. The auxiliary port side streamer 135 can be located a first distance from the central pair of streamers. For example, the auxiliary port side streamer 135 can be located a first distance from the central port side streamer 125. The auxiliary port side streamer 135 can be located a first distance from the central starboard side streamer 130. The first distance can include distances between about 5 meters and 30 meters. For example, the first distance can be 12.5 meters. The first distance can be less than 5 meters. The first distance can be greater than 30 meters. The auxiliary port side streamer 135 may be a cable (e.g., a surface marine cable), an assembly of wires, or any component capable of connecting a receiver to a recording device which may be located on the vessel 102. The auxiliary port side streamer 135 may be disposed on a port side of the vessel 102. The plurality of streamers 115 can include multiple auxiliary port side streamers 135. For example, the plurality of streamers 115 can include one, two, three, or more auxiliary port side streamers 135.

The plurality of streamers 115 can include an auxiliary starboard side streamer 140. The auxiliary starboard side streamer 140 can be located a second distance from the central pair of streamers. For example, the auxiliary starboard side streamer 140 can be located a second distance from the central port side streamer 125. The auxiliary starboard side streamer 140 can be located a second distance from the central starboard side streamer 130. The second distance can include distances between about 5 meters and 30 meters. For example, the second distance can be 12.5 meters. The second distance can be less than 5 meters. The first second can be greater than 30 meters. The second distance can be approximately the same as the first distance. The auxiliary starboard side streamer 140 may be a cable (e.g., a surface marine cable), an assembly of wires, or any component capable of connecting a receiver to a recording device which may be located on the vessel 102. The auxiliary starboard side streamer 140 may be disposed on a starboard side of the vessel 102. The auxiliary starboard side streamer 140 can be located opposite the auxiliary port side streamer 135. The plurality of streamers 115 can include multiple auxiliary starboard side streamers 140. For example, the plurality of streamers 115 can include one, two, three, or more auxiliary starboard side streamers 140. The plurality of streamers 115 can include exactly eight streamers. For example, the plurality of streamers 115 can include one central port side streamer 125, one central starboard side streamer 130, three auxiliary port side streamers 135, and three auxiliary starboard side streamers 140.

The seabed object detection system 100 can include a source array 127. The source array 127 can include a plurality of sources. The plurality of sources can include a central port side source 150, a central starboard side source 155, an auxiliary port side source 160, and an auxiliary starboard side source 165. A source of the plurality of sources can generate a source shot. A source of the plurality of sources can generate acoustic waves. The source array 127 can generate an acoustic signal to be received by the receiver array 105. For example, the source array 127 can include a plurality of sources coupled to a source cable 197. The source array can include a pattern of sources. The sources can include a central port side source 150, a central starboard side source 155, an auxiliary port side source 160, and an auxiliary starboard side source 165. For example, the central port side source 150, the central starboard side source 155, the auxiliary port side source 160, and the auxiliary starboard side source 165 can be coupled to the source cable 197 to form a source array 127.

The source array 127 can include at least one central pair of sources. The source array 127 can include a central pair of sources. The central pair of sources can include a central port side source 150 and a central starboard side source 155. The central pair of sources can be located between the central pair of streamers. For example, the central port side source 150 can be located between the central port side streamer 125 and the central starboard side streamer 130. The central port side source 150 can generate a source shot. The central port side source 150 can generate acoustic waves. The central port side source 150 can generate acoustic waves to be reflected off a seabed object and received by the plurality of receivers 110. The central port side source 150 can generate acoustic waves to be diffracted off a seabed object and received by the plurality of receivers 110. The central starboard side source 155 can be located between the central port side streamer 125 and the central starboard side streamer 130. The central starboard side source 155 can generate a source shot. The central starboard side source 155 can generate acoustic waves. The central starboard side source 155 can generate acoustic waves to be reflected off a seabed object and received by the plurality of receivers 110. The central starboard side source 155 can generate acoustic waves to be diffracted off a seabed object and received by the plurality of receivers 110.

The source array 127 can include at least one auxiliary port side source 160. The source array can include an auxiliary port side source 160. The auxiliary port side source 160 can be located between the central port side streamer 125 and the auxiliary port side streamer 135. The auxiliary port side source 160 can be located between a first auxiliary port side streamer 135 and a second auxiliary port side streamer 135. The auxiliary port side source 160 can generate a source shot. The auxiliary port side source 160 can generate acoustic waves. The auxiliary port side source 160 can generate acoustic waves to be reflected off a seabed object and received by the plurality of receivers 110. The auxiliary port side source 160 can generate acoustic waves to be diffracted off a seabed object and received by the plurality of receivers 110. The source array 127 can include multiple auxiliary port side sources 160. For example, the source array 127 can include one, two, three, or more auxiliary port side sources 160.

The source array 127 can include at least one auxiliary starboard side source 165. The auxiliary starboard side source 165 can be located between the central starboard side streamer 130 and the auxiliary starboard side streamer 140. The auxiliary starboard side source 165 can be located between a first auxiliary starboard side streamer 140 and a second auxiliary starboard side streamer 140. The auxiliary starboard side source 165 can generate a source shot. The auxiliary starboard side source 165 can generate acoustic waves. The auxiliary starboard side source 165 can generate acoustic waves to be reflected off a seabed object and received by the plurality of receivers 110. The auxiliary starboard side source 165 can generate acoustic waves to be diffracted off a seabed object and received by the plurality of receivers 110. The source array 127 can include multiple auxiliary starboard side source 165. For example, the source array 127 can include one, two, three, or more auxiliary starboard side source 165. The plurality of sources can include exactly eight sources. For example, the plurality of sources can include one central port side source 150, one central starboard side source 155, three auxiliary port side sources 160, and three auxiliary starboard side sources 165.

The seabed object detection system 100 can include a port side diverter 170. The port side diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The port side diverter 170 can be connected by a cable to a starboard side diverter 175. The cable can include a streamer cable 195. For example, the port side diverter 170 can be directed connected or coupled to the streamer cable 195. The port side diverter 170 can be connected or coupled to the streamer cable 195 by a coupling device or a secondary cable. The coupling device can couple the port side diverter 170 to the streamer cable 195. The streamer cable 195 can be connected to the plurality of streamers 115. The plurality of streamers 115 can be connected or coupled to the streamer cable 195 by a coupling device or a secondary cable. The coupling device can couple the streamer cable 195 to the plurality of streamers 115.

The seabed object detection system 100 can include a starboard side diverter 175. The starboard side diverter 175 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The starboard side diverter 175 can be connected by a cable to a port side diverter 170. The cable can include a streamer cable 195. For example, the starboard side diverter 175 can be directed connected or coupled to the streamer cable 195. The starboard side diverter 175 can be connected or coupled to the streamer cable 195 by a coupling device or a secondary cable. The coupling device can couple the starboard side diverter 175 to the streamer cable 195. The streamer cable 195 can be connected to the plurality of streamers 115. The plurality of streamers 115 can be connected or coupled to the streamer cable 195 by a coupling device or a secondary cable. The coupling device can couple the streamer cable 195 to the plurality of streamers 115.

The seabed object detection system 100 can include a vessel 102. The vessel 102 can tow the receiver array 105. The vessel 102 can tow the source array 127. The vessel 102 can tow the source array 127 ahead of the receiver array 105. The vessel 102 can be connected to the port side diverter 170. The vessel 102 can be connected to the port side diverter 170 by a port side cable 180. The vessel 102 can be coupled to the port side diverter 170. The vessel 102 can be coupled to the port side diverter 170 by the port side cable 180. The port side cable 180 may be a surface marine cable, an assembly of wires, or any component capable of connecting a receiver to a recording device which may be located on the vessel 102. The port side cable 180 may be a power cable to transmit electrical power from the vessel 102 to the plurality of sources or the plurality of receivers 110. The vessel 102 can be connected to the starboard side diverter 175. The vessel 102 can be connected to the starboard side diverter 175 by a starboard side cable 185. The vessel 102 can be coupled to the starboard side diverter 175. The vessel 102 can be coupled to the starboard side diverter 175 by the starboard side cable 185. The starboard side cable 185 may be a surface marine cable, an assembly of wires, or any component capable of connecting a receiver to a recording device which may be located on the vessel 102. The starboard side cable 185 may be a power cable to transmit electrical power from the vessel 102 to the plurality of sources or the plurality of receivers 110. The vessel 102 can tow the receiver array 105 and the source array 127 such that the receiver array 105 receives diffraction data diffracted off an object in the seabed. The diffraction data diffracted off the object in the seabed can include diffracted waves generated by the source array 127. The source array 127 can generate an acoustic signals to diffract off the object in the seabed.

The seabed object detection system 100 can include a streamer cable 195. The streamer cable 195 can connect the port side diverter 170 to the starboard side diverter 175. The streamer cable may be a surface marine cable, an assembly of wires, or any component capable of connecting a receiver to a recording device which may be located on the vessel 102. The streamer cable 195 can be coupled to the port side diverter 170. The streamer cable 195 can be coupled to the starboard side diverter 175. The streamer cable 195 can be multiple cables. For example, the streamer cable 195 can be multiple cables coupled together to form a longer cable. The streamer cable 195 can be connected to the central port side streamer 125. The streamer cable 195 can be connected to the central starboard side streamer 130. The streamer cable 195 can be connected to the auxiliary port side streamer 135. The streamer cable 195 can be connected to the auxiliary starboard side streamer 140.

The streamer cable 195 can be a power cable to transmit electrical power from the vessel 102 to the plurality of receivers 110. The streamer cable 195 can transmit electrical power from the vessel 102 to a receiver disposed on the central port side streamer 125. The streamer cable 195 can transmit electrical power from the vessel 102 to a receiver disposed on the central starboard side streamer 130. The streamer cable 195 can transmit electrical power from the vessel 102 to a receiver disposed on the auxiliary port side streamer 135. The streamer cable 195 can transmit electrical power from the vessel 102 to a receiver disposed on the auxiliary starboard side streamer 140.

The seabed object detection system 100 can include a source cable 197. The source cable 197 can connect the port side cable 180 to the starboard side cable 185. The source cable 197 can couple to the port side cable 180 at a point closer to the port side diverter 170 than to the vessel 102. The source cable 197 can couple to the starboard side cable 185 at a point closer to the starboard side diverter 175 than to the vessel 102. The source cable 197 can be directly connected or coupled to the port side cable 180. The source cable 197 can be directly connected or coupled to the starboard side cable 185. The source cable 197 can be connected to the source array 127. The source cable 197 can be directly connected or coupled to the source array 127. The source cable 197 can be connected to the central port side source 150. The source cable 197 can be connected to the central starboard side source 155. The source cable 197 can be connected to the auxiliary port side source 160. The source cable 197 can be connected to the auxiliary starboard side source 165. The source cable 197 can be connected to the central port side source 150 through a secondary cable. The source cable 197 can be connected to the central starboard side source 155 through a secondary cable. The source cable 197 can be connected to the auxiliary port side source 160 through a secondary cable. The source cable 197 can be connected to the auxiliary starboard side source 165 through a secondary cable.

The source cable 197 can be a power cable to transmit electrical power from the vessel 102 to the plurality of sources. The source cable 197 can transmit electrical power from the vessel 102 to the central port side source 150. The source cable 197 can transmit electrical power from the vessel 102 to the central starboard side source 155. The source cable 197 can transmit electrical power from the vessel 102 to the auxiliary port side source 160. The source cable 197 can transmit electrical power from the vessel 102 to the auxiliary starboard side source 165.

The seabed object detection system 100 can include a plurality of power cables 190. The power cable 190 can include an electrical cable to transmit electrical power. The power cable 190 can transmit electrical power from the vessel 102 to the plurality of sources of the source array 127. The power cable 190 can transmit electrical power from the vessel 102 to the central port side source 150. The power cable 190 can transmit electrical power from the vessel 102 to the central starboard side source 155. The power cable 190 can transmit electrical power from the vessel 102 to the auxiliary port side source 160. The power cable 190 can transmit electrical power from the vessel 102 to the auxiliary starboard side source 165.

Figure 2:
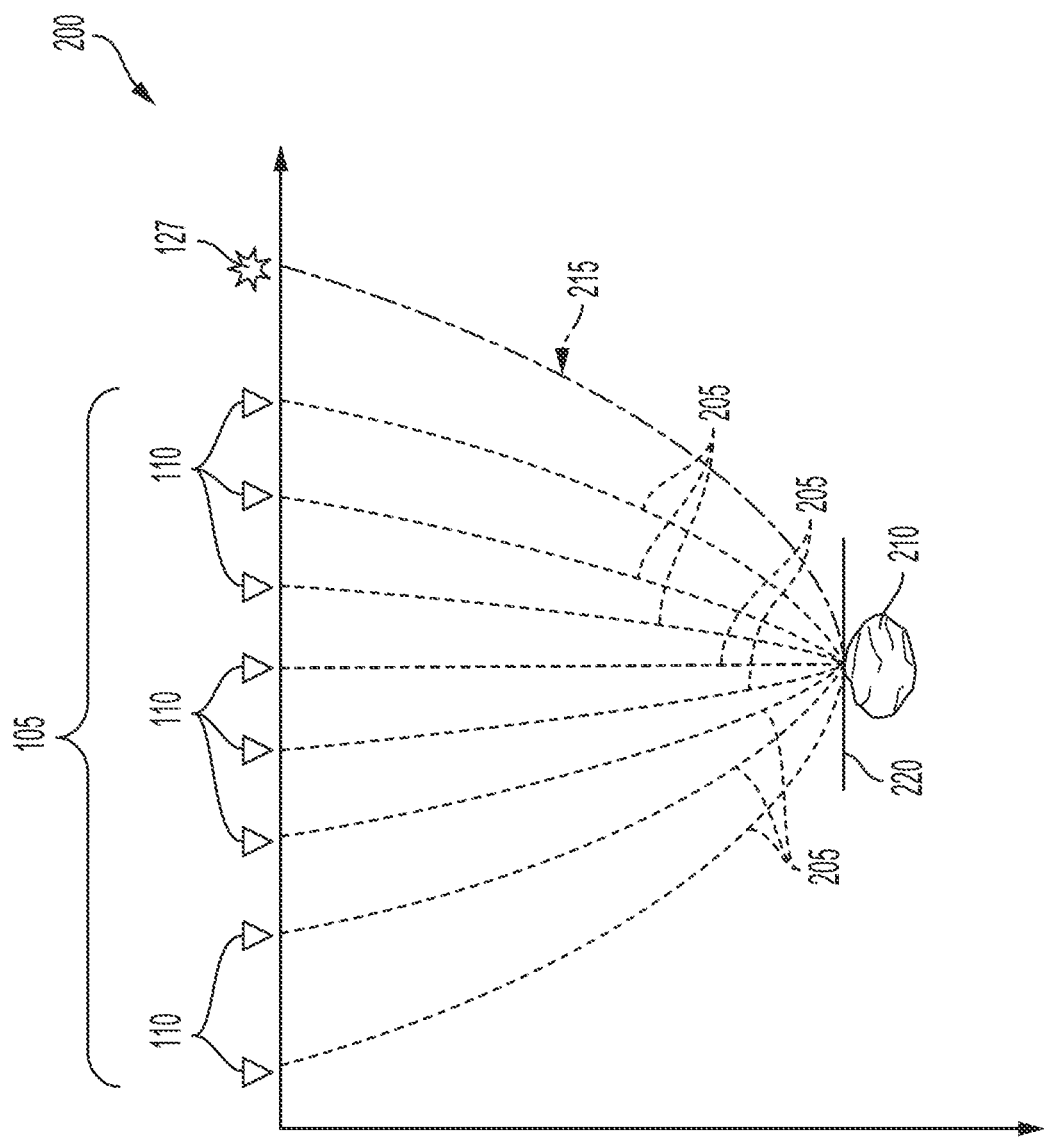
FIG. 2 illustrates a diffraction survey according to an example implementation.

FIG. 2 illustrates a diffraction survey 200. The diffraction survey 200 can include a receiver array 105 and a source array 127. The source array 127 can generate a source shot 215. The source shot 215 can travel through a medium (e.g., sea water) and diffract off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that diffract off the seabed object 210 may include diffraction data. The diffraction data may include diffracted waves 205. The receiver array 105 can receive diffraction data. For example, the receiver array 105 can receive the diffracted waves 205. The plurality of receivers 110 of the receiver array 105 can receive diffraction data. For example, the plurality of receivers 110 can receive the diffracted waves 205. A receiver of the plurality of receivers 110 can receive the diffracted waves 205. The diffraction data can include diffracted waves 205 originating from a seabed object. The diffraction data can include diffracted waves 205 generated from a source shot 215. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures.

The plurality of receivers 110 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the plurality of receivers 110 of the receiver array 105 can detect diffracted waves from an object smaller than the Fresnel zone.

The source array 127 can generate acoustic waves. The acoustic waves can include a source shot 215. The acoustic waves can diffract off the object in the seabed. The receiver array 105 can receive diffracted waves originating from the object in the seabed. The central pair of sources can generate acoustic waves. The central port side source 150 can generate acoustic waves. The central starboard side source 155 can generate acoustic waves. The auxiliary port side source 160 can generate acoustic waves. The auxiliary starboard side source 165 can generate acoustic waves. A receiver of the plurality of receivers 110 of the receiver array 105 can receive the diffracted waves. A receiver disposed on the central port side streamer 125 can receive the diffracted waves. A receiver disposed on the central starboard side streamer 130 can receive the diffracted waves. A receiver disposed on the auxiliary port side streamer 135 can receive the diffracted waves. A receiver disposed on the auxiliary starboard side streamer 140 can receive the diffracted waves.

Figure 3:
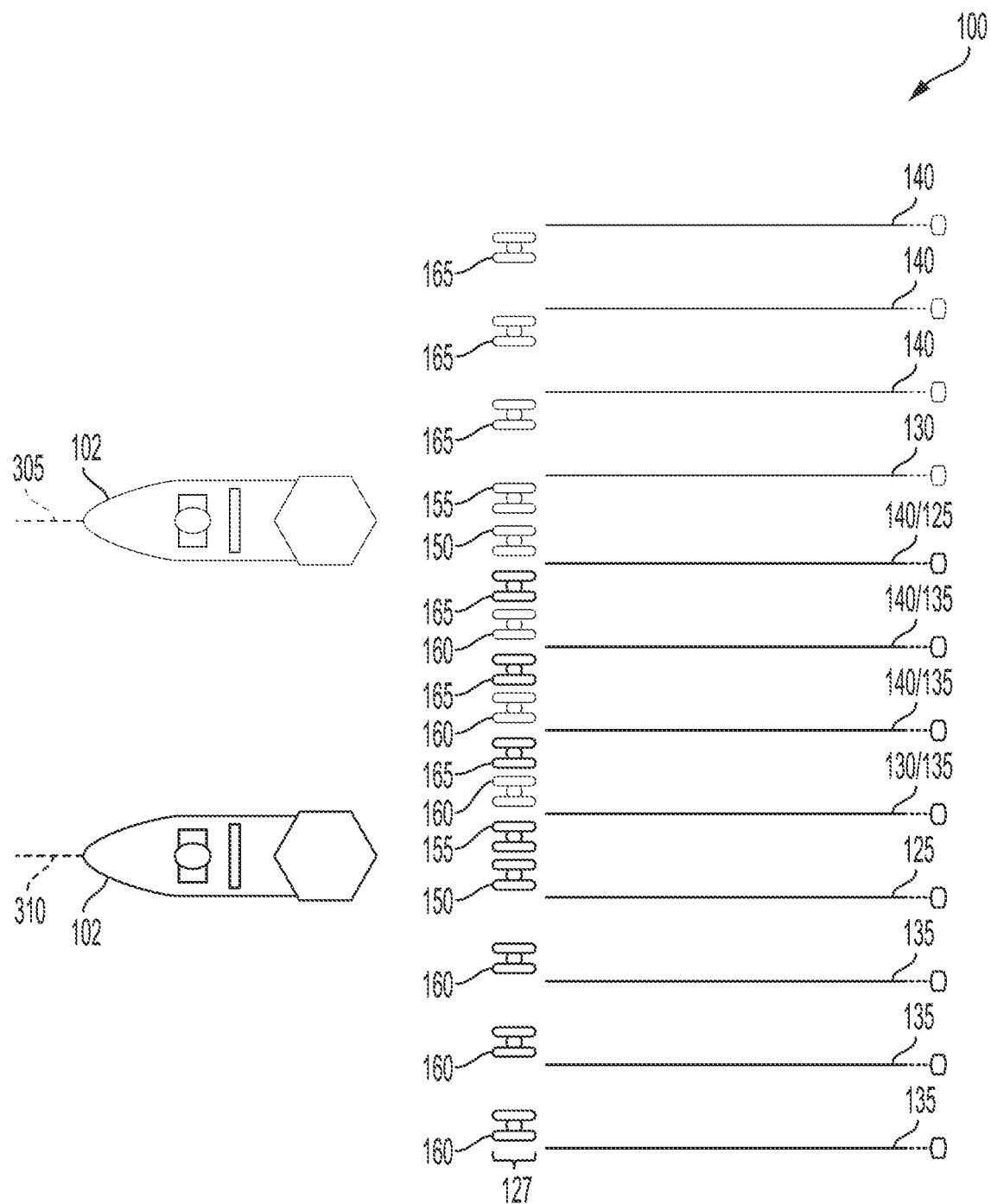
FIG. 3 illustrates a seabed object detection system according to an example implementation.

FIG. 3 illustrates a seabed object detection system 100. The seabed object detection system 100 can include the source array 127. The source array 127 can be towed as part of a first pass 305. For example, the source array 127 towed as part of the first pass 305 can define a first path. The vessel 102 can tow the source array 127 as part of the first pass 305. The source array 127 can be towed as part of a second pass 310. For example, the source array 127 towed as part of the second pass 310 can define a second path. The vessel 102 can tow the source array 127 as part of the first pass 305. The first path can be interleaved with the second path. For example, the source array 127 towed as part of the first pass 305 can interleave with the source array 127 towed as part of the second pass 310.

For example, the auxiliary port side source 160 during the first pass 305 can be between a first auxiliary starboard source 165 and a second auxiliary starboard source 165 during the second pass 310. The auxiliary port side source 160 during the first pass 305 can be between a first auxiliary starboard source 165 and a central starboard side source 155 during the second pass 310. For example, the auxiliary starboard side source 165 during the second pass 310 can be between a central port side source 150 and an auxiliary port side source 160 during the first pass 305. The auxiliary starboard side source 165 during the second pass 310 can be between a first auxiliary port side source 160 and a second auxiliary port side source 160 during the first pass 305.

The central starboard side streamer 130 towed during a second pass 310 can overlap an auxiliary port side streamer 135 towed during a first pass 305. An auxiliary starboard side streamer 140 towed during the second pass 310 can overlap an auxiliary port side streamer 135 towed during a first pass 305. An auxiliary starboard side streamer 140 towed during the second pass 310 can overlap a central port side streamer 125 towed during the first pass 305.

The seabed object detection system 100 can include the at least one auxiliary port side streamer 135. The at least one auxiliary port side streamer 135 can include three auxiliary port side streamers 135. For example, the at least one auxiliary port side streamer 135 can include a first auxiliary port side streamer 135 located a first distance from the central port side streamer 125. The at least one auxiliary port side streamer 135 can include a second auxiliary port side streamer 135 located a second distance from the central port side streamer 125. The first auxiliary port side streamer 135 can be located between the central port side streamer 125 and the first auxiliary port side streamer 135. The at least one auxiliary port side streamer 135 can include a third auxiliary port side streamer 135 located a third distance from the central port side streamer 125. The second auxiliary port side streamer 135 can be located between the first auxiliary port side streamer 135 and the third auxiliary port side streamer 135.

The seabed object detection system 100 can include the at least one auxiliary starboard side streamer 140. The at least one auxiliary starboard side streamer 140 can include three auxiliary starboard side streamers 140. For example, the at least one auxiliary starboard side streamer 140 can include a first auxiliary starboard side streamer 140 located a first distance from the central starboard side streamer 130. The at least one auxiliary starboard side streamer 140 can include a second auxiliary starboard side streamer 140 located a second distance from the central starboard side streamer 130. The first auxiliary starboard side streamer 140 can be located between the central starboard side streamer 130 and the first auxiliary starboard side streamer 140. The at least one auxiliary starboard side streamer 140 can include a third auxiliary starboard side streamer 140 located a third distance from the central starboard side streamer 130. The second auxiliary starboard side streamer 140 can be located between the first auxiliary starboard side streamer 140 and the third auxiliary starboard side streamer 140.

The at least one auxiliary port side source 160 can include three auxiliary port side sources 160. Each of the three auxiliary port side sources 160 can be located between two streamers of the three auxiliary port side streamers 135 and the central port side streamer 125. For example, a first auxiliary port side source 160 can be located between the central port side streamer 125 and the first auxiliary port side streamer 135. The second auxiliary port side source 160 can be located between the first auxiliary port side streamer 135 and the second auxiliary port side streamer 135. The third auxiliary port side source 160 can be located between the second auxiliary port side streamer 135 and the third auxiliary port side streamer 135.

The at least one auxiliary starboard side source 165 can include three auxiliary starboard side sources 165. Each of the three auxiliary starboard side sources 165 can be located between two streamers of the three auxiliary starboard side streamers 140 and the central starboard side streamer 130. For example, a first auxiliary starboard side source 165 can be located between the central starboard side streamer 130 and the first auxiliary starboard side streamer 140. The second auxiliary starboard side source 165 can be located between the first auxiliary starboard side streamer 140 and the second auxiliary starboard side streamer 140. The third auxiliary starboard side source 165 can be located between the second auxiliary starboard side streamer 140 and the third auxiliary starboard side streamer 140.

Figure 4:
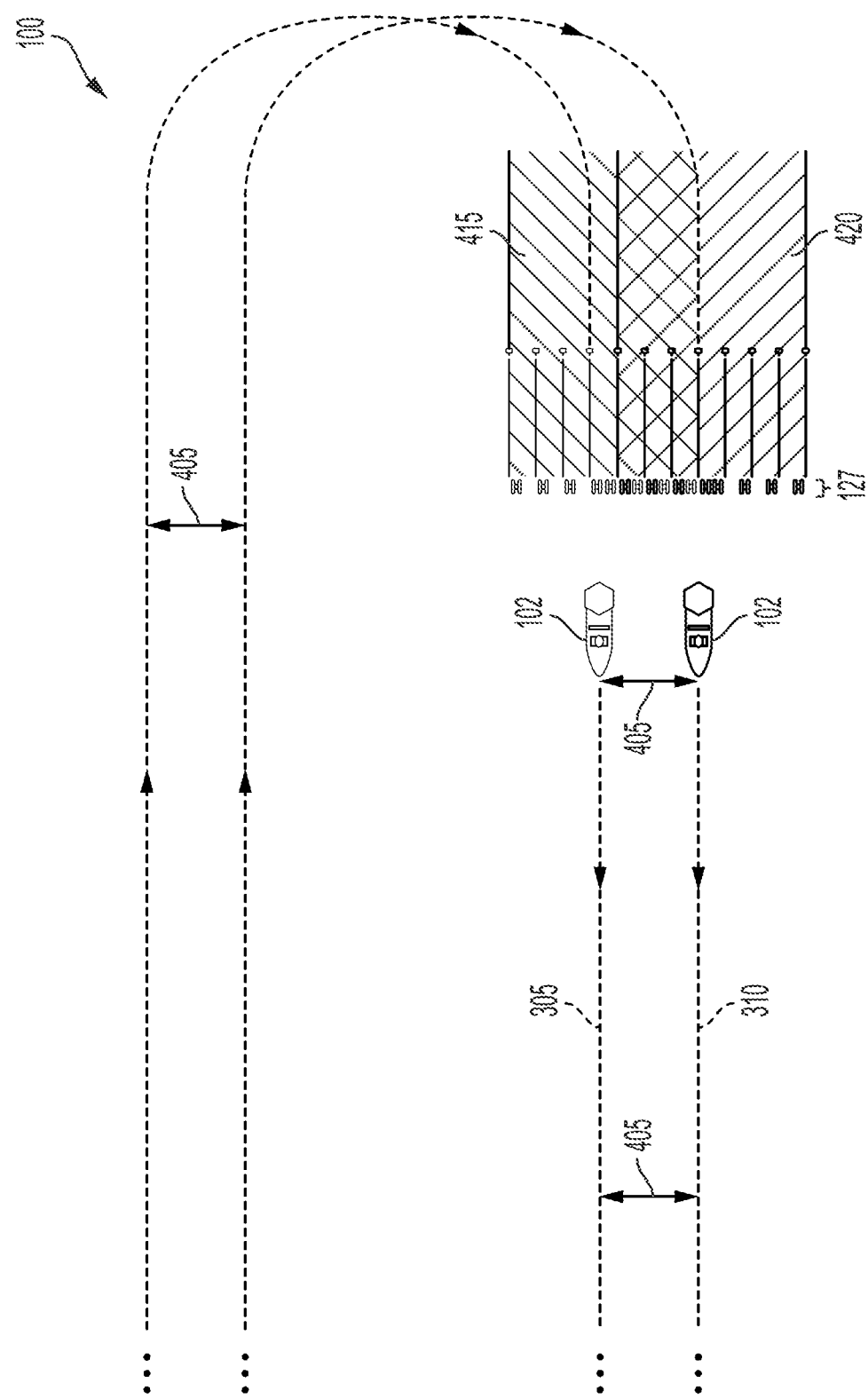
FIG. 4 illustrates a seabed object detection system according to an example implementation.

FIG. 4 illustrates a seabed object detection system 100. The seabed object detection system 100 can include the source array 127. The source array 127 can be towed as part of a first pass 305. For example, the source array 127 towed as part of the first pass 305 can define a first path 415. The vessel 102 can tow the source array 127 as part of the first pass 305. The source array 127 can be towed as part of a second pass 310. For example, the source array 127 towed as part of the second pass 310 can define a second path 420. The vessel 102 can tow the source array 127 as part of the first pass 305. The first path 415 can be interleaved with the second path 420. For example, the source array 127 towed during a first pass 305 can trace out the first path 415. The source array 127 towed during a second pass 310 can trace out the second path 420. The first path 415 and the second path 420 can overlap.

The seabed object detection system 100 perform a survey. The survey can include a first pass 305 and a second pass 310. The first pass 305 can proceed in a pattern (e.g., an elliptical pattern, an oval pattern, an obround pattern, a circular pattern). For example, the vessel 102 can tow the source array 127 as part of the first pass 305. The vessel 102 can tow the receiver array 105 as part of the first pass 305. The vessel 102 can tow the source array 127 as part of the second pass 310. The second pass 310 can proceed in a pattern (e.g., an elliptical pattern, an oval pattern, an obround pattern, a circular pattern). The vessel 102 can tow the receiver array 105 as part of the second pass 310. The first pass 305 can be a distance 405 from the second pass 310. The vessel 102 can tow the source array 127 as a part of the first pass 305 a distance 405 from the second pass 310. The vessel 102 can tow the receiver array 105 as part of the first pass 305 a distance 405 from the second pass 310.

The seabed object detection system 100 can include an offset 405 between the first path 415 and the second path 420. For example, the central starboard side source 155 during the first pass 305 can include an offset 405 from the central starboard side source 155 during the second pass 310. The central port side source 150 during the first pass 305 can include an offset 405 from the central port side source 150 during the second pass 310. The auxiliary starboard side source 165 during the first pass 305 can include an offset 405 from the auxiliary starboard side source 165 during the second pass 310. The auxiliary port side source 160 during the first pass 305 can include an offset 405 from the auxiliary port side source 160 during the second pass 310. For example, the central starboard side streamer 130 during the first pass 305 can include an offset 405 from the central starboard side streamer 130 during the second pass 310. The central port side streamer 125 during the first pass 305 can include an offset 405 from the central port side streamer 125 during the second pass 310. The auxiliary starboard side streamer 140 during the first pass 305 can include an offset 405 from the auxiliary starboard side streamer 140 during the second pass 310. The auxiliary port side streamer 135 during the first pass 305 can include an offset 405 from the auxiliary port side streamer 135 during the second pass 310. The vessel 102 during the first pass 305 can include an offset 405 from the vessel 102 during the second pass.

The seabed object detection system 100 can include a vessel 102 configured to tow the receiver array 105 and the source array 127. The vessel 102 can tow the receiver array 105 and the source array 127 during a first pass 305. The first pass 305 can proceed in a pattern (e.g., an elliptical pattern, an oval pattern, an obround pattern, a circular pattern). For example, the vessel 102 can tow the source array 127 as part of the first pass 305. The vessel 102 can tow the receiver array 105 as part of the first pass 305.

The vessel 102 can tow the receiver array 105 and the source array 127 during a second pass 310. The vessel 102 can tow the source array 127 as part of the second pass 310. The vessel 102 can tow the receiver array 105 as part of the second pass 310. The second pass 310 can proceed in a pattern (e.g., an elliptical pattern, an oval s, an obround pattern, a circular pattern). For example, the vessel 102 can tow the source array 127 as part of the second pass 310. The vessel 102 can tow the receiver array 105 as part of the second pass 310.

The vessel 102 during the first pass 305 can be located a distance 405 from the vessel 102 during the second pass 310. The distance 405 can be based on a number of the plurality of streamers 115 and a distance between the plurality of streamers 115. The distance 405 can be the number of plurality of streamers 115 times the distance between the plurality of streamers divided by two. For example, the number of streamers can be eight. The distance between two streamers of the plurality of streamers 115 can be 12.5 m. The distance between two streamers of the plurality of streamers 115 can be less than 12.5 m. The distance between two streamers of the plurality of streamers 115 can be greater than 12.5 m. Therefore the distance 405 can be 50 m. The number of streamers deployed can be an integer multiple of two. The number of streamers deployed can be equal to or greater than four. The number of sources deployed can be a multiple of the number of streamers deployed. The number of sources between the central pair of streamers can be a multiple of two. The number of sources between the central port side streamer 125 and the central starboard side streamer 130 can be a multiple of two.

Figure 5:
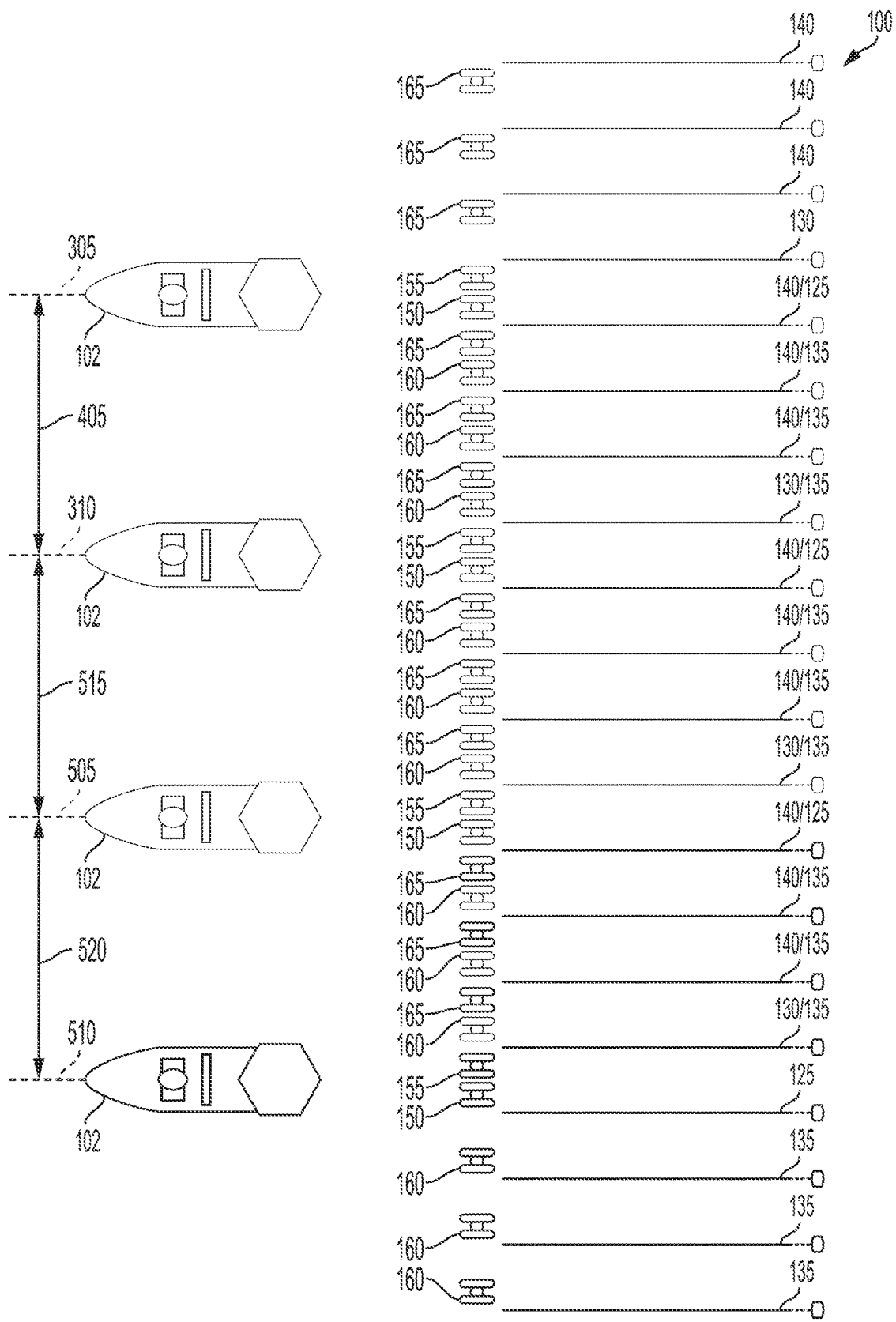
FIG. 5 illustrates a seabed object detection system according to an example implementation.

FIG. 5 illustrates a seabed object detection system 100. The seabed object detection system 100 can include the source array 127. The source array 127 can be towed as part of a first pass 305. For example, the source array 127 towed as part of the first pass 305 can define a first path 415. The vessel 102 can tow the source array 127 as part of the first pass 305. The source array 127 can be towed as part of a second pass 310. For example, the source array 127 towed as part of the second pass 310 can define a second path 420. The vessel 102 can tow the source array 127 as part of the first pass 305. The first path 415 can be interleaved with the second path 420. For example, the source array 127 towed as part of the first pass 305 can interleave with the source array 127 towed as part of the second pass 310. The source array 127 can be towed as part of a third pass 505. The vessel 102 can tow the source array 127 as part of the third pass 505. The source array 127 can be towed as part of a fourth pass 510. For example, the source array 127 towed as part of the fourth pass 510 can define a fourth path. The vessel 102 can tow the source array 127 as part of the third pass 505. The third pass 505 can interleave with the source array 127 towed as part of the fourth pass 510. The second pass 310 can interleave with the source array 127 towed as part of the third pass 505.

For example, the auxiliary port side source 160 during the first pass 305 can be between a first auxiliary starboard source 165 and a second auxiliary starboard source 165 during the second pass 310. The auxiliary port side source 160 during the first pass 305 can be between a first auxiliary starboard source 165 and a central starboard side source 155 during the second pass 310. For example, the auxiliary starboard side source 165 during the second pass 310 can be between a central port side source 150 and an auxiliary port side source 160 during the first pass 305. The auxiliary starboard side source 165 during the second pass 310 can be between a first auxiliary port side source 160 and a second auxiliary port side source 160 during the first pass 305.

The central starboard side streamer 130 towed during a second pass 310 can overlap an auxiliary port side streamer 135 towed during a first pass 305. An auxiliary starboard side streamer 140 towed during the second pass 310 can overlap an auxiliary port side streamer 135 towed during a first pass 305. An auxiliary starboard side streamer 140 towed during the second pass 310 can overlap a central port side streamer 125 towed during the first pass 305.

The seabed object detection system 100 can include the at least one auxiliary port side streamer 135. The at least one auxiliary port side streamer 135 can include three auxiliary port side streamers 135. For example, the at least one auxiliary port side streamer 135 can include a first auxiliary port side streamer 135 located a first distance from the central port side streamer 125. The at least one auxiliary port side streamer 135 can include a second auxiliary port side streamer 135 located a second distance from the central port side streamer 125. The first auxiliary port side streamer 135 can be located between the central port side streamer 125 and the first auxiliary port side streamer 135. The at least one auxiliary port side streamer 135 can include a third auxiliary port side streamer 135 located a third distance from the central port side streamer 125. The second auxiliary port side streamer 135 can be located between the first auxiliary port side streamer 135 and the third auxiliary port side streamer 135.

The seabed object detection system 100 can include the at least one auxiliary starboard side streamer 140. The at least one auxiliary starboard side streamer 140 can include three auxiliary starboard side streamers 140. For example, the at least one auxiliary starboard side streamer 140 can include a first auxiliary starboard side streamer 140 located a first distance from the central starboard side streamer 130. The at least one auxiliary starboard side streamer 140 can include a second auxiliary starboard side streamer 140 located a second distance from the central starboard side streamer 130. The first auxiliary starboard side streamer 140 can be located between the central starboard side streamer 130 and the first auxiliary starboard side streamer 140. The at least one auxiliary starboard side streamer 140 can include a third auxiliary starboard side streamer 140 located a third distance from the central starboard side streamer 130. The second auxiliary starboard side streamer 140 can be located between the first auxiliary starboard side streamer 140 and the third auxiliary starboard side streamer 140.

The at least one auxiliary port side source 160 can include three auxiliary port side sources 160. Each of the three auxiliary port side sources 160 can be located between two streamers of the three auxiliary port side streamers 135 and the central port side streamer 125. For example, a first auxiliary port side source 160 can be located between the central port side streamer 125 and the first auxiliary port side streamer 135. The second auxiliary port side source 160 can be located between the first auxiliary port side streamer 135 and the second auxiliary port side streamer 135. The third auxiliary port side source 160 can be located between the second auxiliary port side streamer 135 and the third auxiliary port side streamer 135.

The at least one auxiliary starboard side source 165 can include three auxiliary starboard side sources 165. Each of the three auxiliary starboard side sources 165 can be located between two streamers of the three auxiliary starboard side streamers 140 and the central starboard side streamer 130. For example, a first auxiliary starboard side source 165 can be located between the central starboard side streamer 130 and the first auxiliary starboard side streamer 140. The second auxiliary starboard side source 165 can be located between the first auxiliary starboard side streamer 140 and the second auxiliary starboard side streamer 140. The third auxiliary starboard side source 165 can be located between the second auxiliary starboard side streamer 140 and the third auxiliary starboard side streamer 140. The vessel 102 during the second pass 310 can be located a distance 515 from the vessel 102 during the third pass 505.

For example, the auxiliary port side source 160 during the second pass 310 can be between a first auxiliary starboard source 165 and a second auxiliary starboard source 165 during the third pass 505. The auxiliary port side source 160 during the second pass 310 can be between a first auxiliary starboard source 165 and a central starboard side source 155 during the third pass 505. For example, the auxiliary starboard side source 165 during the third pass 505 can be between a central port side source 150 and an auxiliary port side source 160 during the second pass 310. The auxiliary starboard side source 165 during the third pass 505 can be between a first auxiliary port side source 160 and a second auxiliary port side source 160 during the second pass 310. The vessel 102 during the second pass 310 can be located a distance 515 from the vessel 102 during the third pass 505.

The central starboard side streamer 130 towed during a third pass 505 can overlap an auxiliary port side streamer 135 towed during a second pass 310. An auxiliary starboard side streamer 140 towed during the third pass 505 can overlap an auxiliary port side streamer 135 towed during a second pass 310. An auxiliary starboard side streamer 140 towed during the third pass 505 can overlap a central port side streamer 125 towed during the second pass 310.

The seabed object detection system 100 can include the at least one auxiliary port side streamer 135. The at least one auxiliary port side streamer 135 can include three auxiliary port side streamers 135. For example, the at least one auxiliary port side streamer 135 can include a first auxiliary port side streamer 135 located a first distance from the central port side streamer 125. The at least one auxiliary port side streamer 135 can include a second auxiliary port side streamer 135 located a second distance from the central port side streamer 125. The first auxiliary port side streamer 135 can be located between the central port side streamer 125 and the first auxiliary port side streamer 135. The at least one auxiliary port side streamer 135 can include a third auxiliary port side streamer 135 located a third distance from the central port side streamer 125. The second auxiliary port side streamer 135 can be located between the first auxiliary port side streamer 135 and the third auxiliary port side streamer 135.

The seabed object detection system 100 can include the at least one auxiliary starboard side streamer 140. The at least one auxiliary starboard side streamer 140 can include three auxiliary starboard side streamers 140. For example, the at least one auxiliary starboard side streamer 140 can include a first auxiliary starboard side streamer 140 located a first distance from the central starboard side streamer 130. The at least one auxiliary starboard side streamer 140 can include a second auxiliary starboard side streamer 140 located a second distance from the central starboard side streamer 130. The first auxiliary starboard side streamer 140 can be located between the central starboard side streamer 130 and the first auxiliary starboard side streamer 140. The at least one auxiliary starboard side streamer 140 can include a third auxiliary starboard side streamer 140 located a third distance from the central starboard side streamer 130. The second auxiliary starboard side streamer 140 can be located between the first auxiliary starboard side streamer 140 and the third auxiliary starboard side streamer 140.

The at least one auxiliary port side source 160 can include three auxiliary port side sources 160. Each of the three auxiliary port side sources 160 can be located between two streamers of the three auxiliary port side streamers 135 and the central port side streamer 125. For example, a first auxiliary port side source 160 can be located between the central port side streamer 125 and the first auxiliary port side streamer 135. The second auxiliary port side source 160 can be located between the first auxiliary port side streamer 135 and the second auxiliary port side streamer 135. The third auxiliary port side source 160 can be located between the second auxiliary port side streamer 135 and the third auxiliary port side streamer 135.

The at least one auxiliary starboard side source 165 can include three auxiliary starboard side sources 165. Each of the three auxiliary starboard side sources 165 can be located between two streamers of the three auxiliary starboard side streamers 140 and the central starboard side streamer 130. For example, a first auxiliary starboard side source 165 can be located between the central starboard side streamer 130 and the first auxiliary starboard side streamer 140. The second auxiliary starboard side source 165 can be located between the first auxiliary starboard side streamer 140 and the second auxiliary starboard side streamer 140. The third auxiliary starboard side source 165 can be located between the second auxiliary starboard side streamer 140 and the third auxiliary starboard side streamer 140.

For example, the auxiliary port side source 160 during the third pass 505 can be between a first auxiliary starboard source 165 and a second auxiliary starboard source 165 during the fourth pass 510. The auxiliary port side source 160 during the third pass 505 can be between a first auxiliary starboard source 165 and a central starboard side source 155 during the fourth pass 510. For example, the auxiliary starboard side source 165 during the fourth pass 510 can be between a central port side source 150 and an auxiliary port side source 160 during the third pass 505. The auxiliary starboard side source 165 during the fourth pass 510 can be between a first auxiliary port side source 160 and a second auxiliary port side source 160 during the third pass 505. The vessel 102 during the third pass 505 can be located a distance 520 from the vessel 102 during the fourth pass 510.

The central starboard side streamer 130 towed during a fourth pass 510 can overlap an auxiliary port side streamer 135 towed during a third pass 505. An auxiliary starboard side streamer 140 towed during the fourth pass 510 can overlap an auxiliary port side streamer 135 towed during a third pass 505. An auxiliary starboard side streamer 140 towed during the fourth pass 510 can overlap a central port side streamer 125 towed during the third pass 505. The vessel 102 during the third pass 505 can be located a distance 520 from the vessel 102 during the fourth pass 510.

The seabed object detection system 100 can include the at least one auxiliary port side streamer 135. The at least one auxiliary port side streamer 135 can include three auxiliary port side streamers 135. For example, the at least one auxiliary port side streamer 135 can include a first auxiliary port side streamer 135 located a first distance from the central port side streamer 125. The at least one auxiliary port side streamer 135 can include a second auxiliary port side streamer 135 located a second distance from the central port side streamer 125. The first auxiliary port side streamer 135 can be located between the central port side streamer 125 and the first auxiliary port side streamer 135. The at least one auxiliary port side streamer 135 can include a third auxiliary port side streamer 135 located a third distance from the central port side streamer 125. The second auxiliary port side streamer 135 can be located between the first auxiliary port side streamer 135 and the third auxiliary port side streamer 135.

The seabed object detection system 100 can include the at least one auxiliary starboard side streamer 140. The at least one auxiliary starboard side streamer 140 can include three auxiliary starboard side streamers 140. For example, the at least one auxiliary starboard side streamer 140 can include a first auxiliary starboard side streamer 140 located a first distance from the central starboard side streamer 130. The at least one auxiliary starboard side streamer 140 can include a second auxiliary starboard side streamer 140 located a second distance from the central starboard side streamer 130. The first auxiliary starboard side streamer 140 can be located between the central starboard side streamer 130 and the first auxiliary starboard side streamer 140. The at least one auxiliary starboard side streamer 140 can include a third auxiliary starboard side streamer 140 located a third distance from the central starboard side streamer 130. The second auxiliary starboard side streamer 140 can be located between the first auxiliary starboard side streamer 140 and the third auxiliary starboard side streamer 140.

The at least one auxiliary port side source 160 can include three auxiliary port side sources 160. Each of the three auxiliary port side sources 160 can be located between two streamers of the three auxiliary port side streamers 135 and the central port side streamer 125. For example, a first auxiliary port side source 160 can be located between the central port side streamer 125 and the first auxiliary port side streamer 135. The second auxiliary port side source 160 can be located between the first auxiliary port side streamer 135 and the second auxiliary port side streamer 135. The third auxiliary port side source 160 can be located between the second auxiliary port side streamer 135 and the third auxiliary port side streamer 135.

The at least one auxiliary starboard side source 165 can include three auxiliary starboard side sources 165. Each of the three auxiliary starboard side sources 165 can be located between two streamers of the three auxiliary starboard side streamers 140 and the central starboard side streamer 130. For example, a first auxiliary starboard side source 165 can be located between the central starboard side streamer 130 and the first auxiliary starboard side streamer 140. The second auxiliary starboard side source 165 can be located between the first auxiliary starboard side streamer 140 and the second auxiliary starboard side streamer 140. The third auxiliary starboard side source 165 can be located between the second auxiliary starboard side streamer 140 and the third auxiliary starboard side streamer 140.

Figure 6:
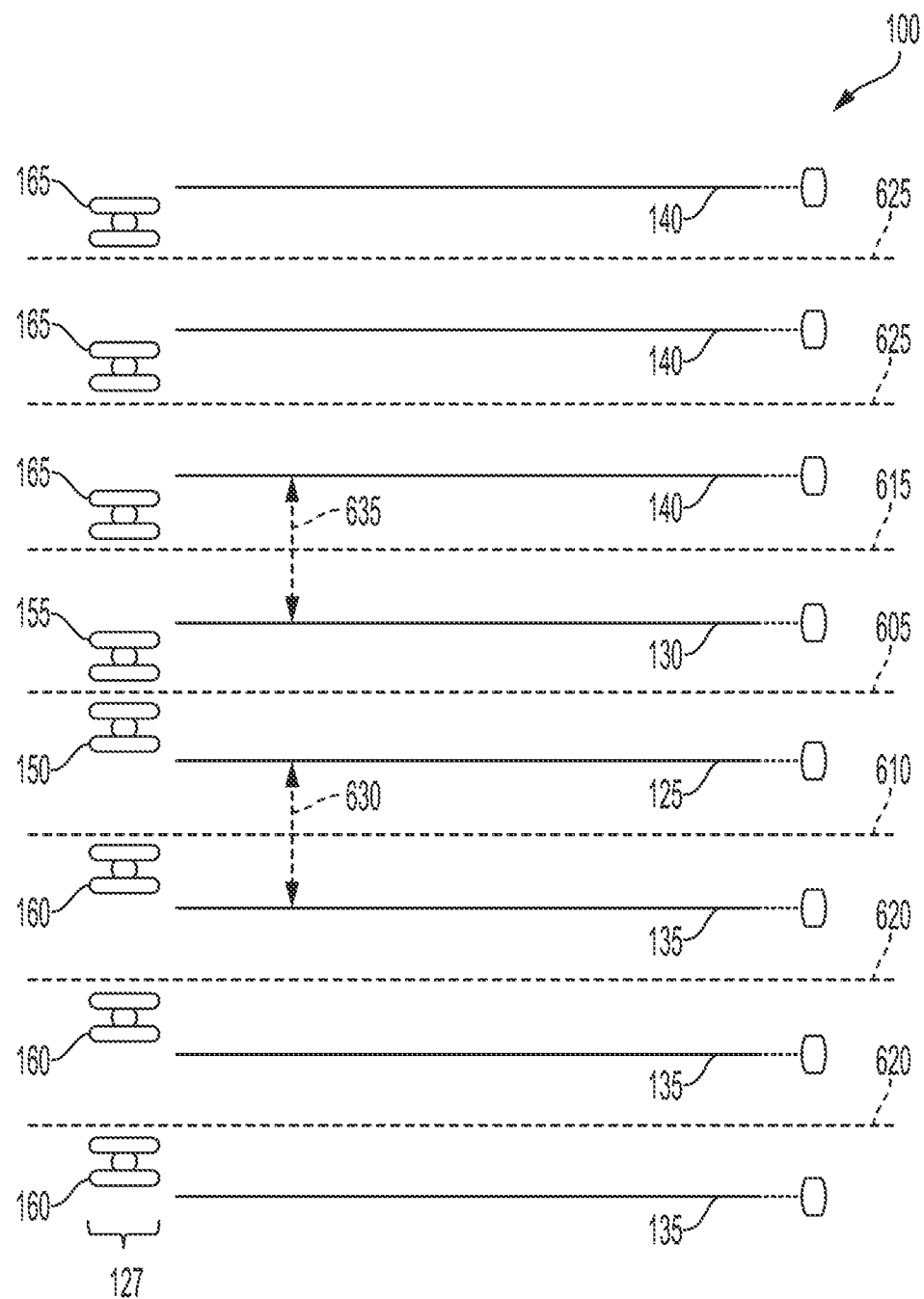
FIG. 6 illustrates a seabed object detection system according to an example implementation.

FIG. 6 illustrates a seabed object detection system 100. The seabed object detection system 100 can include the source array 127. The source array 127 can include a central port side source 150 and a central starboard side source 155. The source array 127 can include at least one auxiliary port side source 160 and at least one auxiliary starboard side source 165. The seabed object detection system 100 can include a midline 605 of the central port side streamer 125 and the central starboard side streamer 130.

The central port side source 150 can be located between the central port side streamer 125 and the midline 605 of the central port side streamer 125 and the central starboard side streamer 130. For example, the central port side source 150 can be located between the central port side streamer 125 and the central starboard side streamer 130. The central port side source 150 can be located between the central port side streamer 125 and an auxiliary starboard side streamer 140. The central port side source 150 can be located between the central port side streamer 125 and a first auxiliary starboard side streamer 140. The central port side source 150 can be located between the central port side streamer 125 and a second auxiliary starboard side streamer 140. The central port side source 150 can be located between the central port side streamer 125 and a third auxiliary starboard side streamer 140. For example, the central port side source 150 can be located between an auxiliary port side streamer 135 and the midline 605 of the central port side streamer 125 and the central starboard side streamer 130. The central port side source 150 can be located between a first auxiliary port side streamer 135 and the midline 605 of the central port side streamer 125 and the central starboard side streamer 130. The central port side source 150 can be located between a second auxiliary port side streamer 135 and the midline 605 of the central port side streamer 125 and the central starboard side streamer 130. The central port side source 150 can be located between a third auxiliary port side streamer 135 and the midline 605 of the central port side streamer 125 and the central starboard side streamer 130.

The central starboard side source 155 can be located between the central starboard side streamer 130 and the midline 605 of the central port side streamer 125 and the central starboard side streamer 130. The central starboard side source 155 can be located between the central port side streamer 125 and the central starboard side streamer 130. For example, the central starboard side source 155 can be located between the central starboard side streamer 130 and an auxiliary port side streamer 135. The central starboard side source 155 can be located between the central starboard side streamer 130 and a first auxiliary port side streamer 135. The central starboard side source 155 can be located between the central starboard side streamer 130 and a second auxiliary port side streamer 135. The central starboard side source 155 can be located between the central starboard side streamer 130 and a third auxiliary port side streamer 135. For example, the central starboard side source 155 can be located between an auxiliary starboard side streamer 140 and the midline 605 of the central starboard side streamer 130 and the central starboard side streamer 130. The central starboard side source 155 can be located between a first auxiliary starboard side streamer 140 and the midline 605 of the central starboard side streamer 130 and the central starboard side streamer 130. The central starboard side source 155 can be located between a second auxiliary starboard side streamer 140 and the midline 605 of the central starboard side streamer 130 and the central starboard side streamer 130. The central starboard side source 155 can be located between a third auxiliary starboard side streamer 140 and the midline 605 of the central starboard side streamer 130 and the central starboard side streamer 130.

The central port side source 150 can be located equidistant from the central port side streamer 125 and the midline 605 of the central port side streamer 125 and the central starboard side streamer 130. For example, the central port side source 150 can be located a first distance from the central port side streamer 125. The central port side source 150 can be located a second distance from the midline 605 of the central port side streamer 125 and the central starboard side streamer 130. The first distance and the second distance can be substantially the same or equal.

The central starboard side source 155 can be located equidistant from the central starboard side streamer 130 and the midline 605 of the central port side streamer 125 and the central starboard side streamer 130. For example, the central starboard side source 155 can be located a first distance from the central starboard side streamer 130. The central starboard side source 155 can be located a second distance from the midline 605 of the central port side streamer 125 and the central starboard side streamer 130. The first distance and the second distance can be substantially the same or equal.

The at least one auxiliary port side source 160 can be located between the central port side streamer 125 and a midline 610 of the central port side streamer 125 and the at least one auxiliary port side streamer 135. For example, the at least one auxiliary port side source 160 can be located a first distance from the central port side streamer 125. The at least one auxiliary port side source 160 can be located a second distance from the midline 610 of the central port side streamer 125 and the at least one auxiliary port side streamer 135. The first distance and the second distance be substantially the same or equal. For example, the first auxiliary port side source 160 can be located a first distance from the central port side streamer 125. The first auxiliary port side source 160 can be located a second distance from the midline 610 of the central port side streamer 125 and the at least one auxiliary port side streamer 135. The first distance and the second distance be substantially the same or equal.

The at least one auxiliary starboard side source 165 can be located between the central starboard side streamer 130 and a midline 615 of the central starboard side streamer 130 and the at least one auxiliary starboard side streamer 140. For example, the at least one auxiliary starboard side source 165 can be located a first distance from the central starboard side streamer 130. The at least one auxiliary starboard side source 165 can be located a second distance from the midline 615 of the central starboard side streamer 130 and the at least one auxiliary starboard side streamer 140. The first distance and the second distance be substantially the same or equal. For example, the first auxiliary starboard side source 165 can be located a first distance from the central starboard side streamer 130. The first auxiliary starboard side source 165 can be located a second distance from the midline 615 of the central starboard side streamer 130 and the at least one auxiliary starboard side streamer 140. The first distance and the second distance be substantially the same or equal.

The at least one auxiliary port side source 160 can be located between the auxiliary port side streamer 135 and a midline 610 of the central port side streamer 125 and the at least one auxiliary port side streamer 135. For example, the at least one auxiliary port side source 160 can be located a first distance from the auxiliary port side streamer 135. The at least one auxiliary port side source 160 can be located a second distance from the midline 610 of the central port side streamer 125 and the at least one auxiliary port side streamer 135. The first distance and the second distance be substantially the same or equal. For example, the first auxiliary port side source 160 can be located a first distance from the auxiliary port side streamer 135. The first auxiliary port side source 160 can be located a second distance from the midline 610 of the central port side streamer 125 and the at least one auxiliary port side streamer 135. The first distance and the second distance be substantially the same or equal.

The at least one auxiliary starboard side source 165 can be located between the auxiliary starboard side streamer 140 and a midline 615 of the central starboard side streamer 130 and the at least one auxiliary starboard side streamer 140. For example, the at least one auxiliary starboard side source 165 can be located a first distance from the auxiliary starboard side streamer 140. The at least one auxiliary starboard side source 165 can be located a second distance from the midline 615 of the central starboard side streamer 130 and the at least one auxiliary starboard side streamer 140. The first distance and the second distance be substantially the same or equal. For example, the first auxiliary starboard side source 165 can be located a first distance from the auxiliary starboard side streamer 140. The first auxiliary starboard side source 165 can be located a second distance from the midline 615 of the central starboard side streamer 130 and the at least one auxiliary starboard side streamer 140. The first distance and the second distance be substantially the same or equal.

The at least one auxiliary port side source 160 can be located between a first auxiliary port side streamer 135 and a midline 620 of the first auxiliary port side streamer 135 and a second auxiliary port side streamer 135. For example, the at least one auxiliary port side source 160 can be located a first distance from the first auxiliary port side streamer 135. The at least one auxiliary port side source 160 can be located a second distance from the midline 620 of the first auxiliary port side streamer 135 and the second auxiliary port side streamer 135. The first distance and the second distance be substantially the same or equal. For example, the first auxiliary port side source 160 can be located a first distance from the first auxiliary port side streamer 135. The first auxiliary port side source 160 can be located a second distance from the midline 620 of the first auxiliary port side streamer 135 and the second auxiliary port side streamer 135. The first distance and the second distance be substantially the same or equal.

The at least one auxiliary starboard side source 165 can be located between a first auxiliary starboard side streamer 140 and a midline 625 of the first auxiliary starboard streamer 140 and a second auxiliary starboard side streamer 140. For example, the at least one auxiliary starboard side source 165 can be located a first distance from the first auxiliary starboard side streamer 140. The at least one auxiliary starboard side source 165 can be located a second distance from the midline 625 of the first auxiliary starboard side streamer 140 and the second auxiliary starboard side streamer 140. The first distance and the second distance be substantially the same or equal. For example, the first auxiliary starboard side source 165 can be located a first distance from the first auxiliary starboard side streamer 140. The first auxiliary starboard side source 165 can be located a second distance from the midline 625 of the first auxiliary starboard side streamer 140 and the second auxiliary port side streamer 135. For example, the at least one auxiliary port side source 160 can be located a first distance from the second auxiliary port side streamer 135. The at least one auxiliary port side source 160 can be located a second distance from the midline 620 of the first auxiliary port side streamer 135 and the second auxiliary port side streamer 135. The first distance and the second distance be substantially the same or equal. For example, the first auxiliary port side source 160 can be located a first distance from the second auxiliary port side streamer 135. The first auxiliary port side source 160 can be located a second distance from the midline 620 of the first auxiliary port side streamer 135 and the second auxiliary port side streamer 135. The first distance and the second distance be substantially the same or equal.

The at least one auxiliary starboard side source 165 can be located between a first auxiliary starboard side streamer 140 and a midline 625 of the first auxiliary starboard streamer 140 and a second auxiliary starboard side streamer 140. For example, the at least one auxiliary starboard side source 165 can be located a first distance from the second auxiliary starboard side streamer 140. The at least one auxiliary starboard side source 165 can be located a second distance from the midline 625 of the first auxiliary starboard side streamer 140 and the second one auxiliary starboard side streamer 140. The first distance and the second distance be substantially the same or equal. For example, the first auxiliary starboard side source 165 can be located a first distance from the second auxiliary starboard side streamer 140. The first auxiliary starboard side source 165 can be located a second distance from the midline 625 of the first auxiliary starboard side streamer 140 and the second auxiliary starboard side streamer 140. The first distance and the second distance be substantially the same or equal.

For example, the at least one auxiliary port side streamer 135 can be located a first distance 630 from the central pair of streamers. The at least one auxiliary port side streamer 135 can be located a first distance 630 from the central port side streamer 125. The at least one auxiliary port side streamer 135 can be located a first distance 630 from the central starboard side streamer 130. For example, the at least one auxiliary starboard side streamer 140 can be located a second distance 635 from the central pair of streamers. The at least one auxiliary starboard side streamer 140 can be located a second distance 635 from the central port side streamer 125. The at least one auxiliary starboard side streamer 140 can be located a second distance 635 from the central starboard side streamer 130. The first distance 630 and the second distance 635 can be equal. The first distance 630 and the second distance 635 can be substantially the same.

Figure 7:
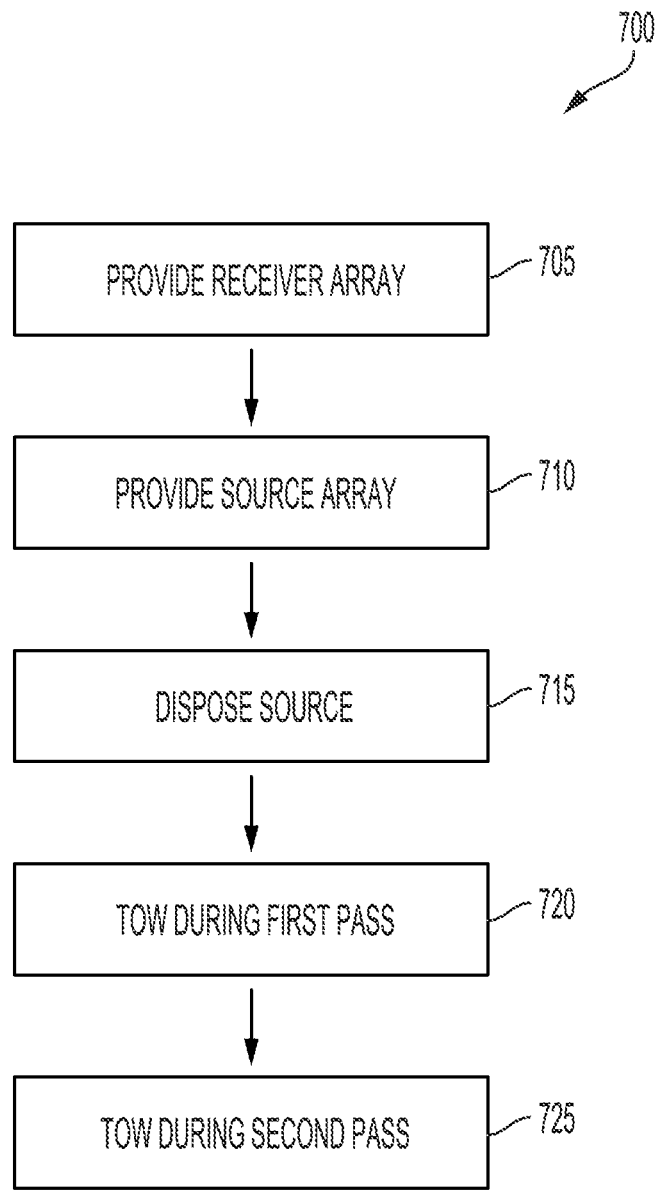
FIG. 7 illustrates a method of seabed object detection according to an example implementation.

FIG. 7 illustrates a method of seabed object detection according to an embodiment. In brief summary, the method 700 can include providing a receiver array (BLOCK 705). The method 700 can include providing a source array (BLOCK 710). The method 700 can include disposing a source (BLOCK 715). The method 700 can include towing during a first pass (BLOCK 720). The method can include towing during a second pass (BLOCK 725).

The method 700 can include providing a receiver array (BLOCK 705). The method can include providing a providing a receiver array including a plurality of receivers. The plurality of receivers can receive diffraction data diffracted off an object in a seabed. The plurality of receivers can be disposed on a plurality of streamers. The plurality of streamers can include a central pair of streamers. The central pair of streamers can include a central port side streamer and a central starboard side streamer. The plurality of streamers can include at least one auxiliary port side streamer located a first distance from the central pair of streamers. The plurality of streamers can include at least one auxiliary starboard side streamer located a second distance from the central pair of streamers opposite the at least one auxiliary port side streamer.

The method 700 can include providing a source array (BLOCK 710). The source array can include a plurality of sources. The plurality of sources can generate a source shot. The plurality of sources can include at least one central pair of sources. The at least one central pair of sources can include a central port side source and a central starboard side source. The plurality of sources can be located between the central pair of streamers. The source array can include at least one auxiliary port side source. The at least one auxiliary port side source can be located between the central port side streamer and the at least one auxiliary port side streamer. The source array can include at least one auxiliary starboard side source. The at least one auxiliary starboard side source can be located between the central starboard side streamer and the at least one auxiliary starboard side streamer.

The method 700 can include disposing a source (BLOCK 715). Disposing the source can include locating the central port side source between the central port side streamer and a midline of the central port side streamer and the central starboard side streamer. Disposing the source can include locating the central starboard side source between the central starboard side streamer and the midline of the central port side streamer and the central starboard side streamer. Disposing the source can include locating an auxiliary port side source between the central port side streamer and an auxiliary port side streamer. Disposing the source can include locating an auxiliary port side source between a first auxiliary port side streamer and a second auxiliary port side streamer. Disposing the source can include locating an auxiliary port side source between a second auxiliary port side streamer and a third auxiliary port side streamer. Disposing the source can include locating an auxiliary starboard side source between the central starboard side streamer and an auxiliary starboard side streamer. Disposing the source can include locating an auxiliary starboard side source between a first auxiliary starboard side streamer and a second auxiliary starboard side streamer. Disposing the source can include locating an auxiliary starboard side source between a second auxiliary starboard side streamer and a third auxiliary starboard side streamer.

The method 700 can include towing during a first pass (BLOCK 720). The source array can be towed during a first pass. The source array towed during a first pass can define a first path. A vessel can tow the source array as part of the first pass. The vessel can tow the receiver array as part of the first pass. In some embodiments, a vessel during a first pass is located a distance from the vessel during a second pass. The distance can be based on a number of the plurality of streamers and a distance between the plurality of streamers. In some embodiments, the plurality of streamers includes exactly eight streamers. In some embodiments, the method 700 includes receiving, by the receiver array, diffraction data that includes diffracted waves originating from a seabed object and generated from a source shot. In some embodiments, the method 700 include generating, by the source array, acoustic waves to diffract off of a seabed object. The method 700 can include receiving, by the receiver array, diffracted waves originating from the seabed object.

The method 700 can include towing during a second pass (BLOCK 725). The source array can be towed during a second pass. The source array towed during a second pass can define a second path. The vessel can tow the source array as part of the second pass. The vessel can tow the receiver array as part of the second pass. The first path can be interleaved with the second path such that the first path partially overlaps the second path. In some embodiments, the method 700 can include offsetting the first path and the second path. In some embodiments, the method 700 can include providing the source array. The source array can be towed during a third pass. The source array towed during a third pass can define a third path. The third path can be interleaved with the second path such that the third path partially overlaps the second path. In some embodiments, a vessel during a first pass is located a distance from the vessel during a second pass. The distance can be based on a number of the plurality of streamers and a distance between the plurality of streamers. In some embodiments, the plurality of streamers includes exactly eight streamers. In some embodiments, the method 700 includes receiving, by the receiver array, diffraction data that includes diffracted waves originating from a seabed object and generated from a source shot. In some embodiments, the method 700 include generating, by the source array, acoustic waves to diffract off of a seabed object. The method 700 can include receiving, by the receiver array, diffracted waves originating from the seabed object.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seabed object detection system, comprising:
   a source array comprising:
      a central pair of sources;
      an auxiliary port side source; and
      an auxiliary starboard side source;
   wherein the source array towed as part of a first pass defines a first path and the source array towed as part of a second pass defines a second path, the first path interleaved with the second path such that the first path partially overlaps the second path; and
   the auxiliary port side source during the first pass is between the auxiliary starboard side source and the central pair of sources during the second pass.

2. The seabed object detection system of claim 1, comprising:
   a central pair of streamers including a central port side streamer and a central starboard side streamer;
   at least one auxiliary port side streamer located a first distance from the central pair of streamers; and
   at least one auxiliary starboard side streamer located a second distance from the central pair of streamers opposite the at least one auxiliary port side streamer.

3. The seabed object detection system of claim 1, comprising:
   a receiver array including a plurality of receivers disposed on a plurality of streamers, the plurality of streamers including:
      a central pair of streamers including a central port side streamer and a central starboard side streamer;
      at least one auxiliary port side streamer located a first distance from the central pair of streamers; and
      at least one auxiliary starboard side streamer located a second distance from the central pair of streamers opposite the at least one auxiliary port side streamer.

4. The seabed object detection system of claim 1, comprising:
   the central pair of sources including a central port side source and a central starboard side source.

5. The seabed object detection system of claim 1, comprising:
- a central pair of streamers including a central port side streamer and a central starboard side streamer; and
- the central pair of sources including a central port side source and a central starboard side source, and located between the central pair of streamers, the central port side source located between the central port side streamer and a midline of the central port side streamer and the central starboard side streamer.

6. The seabed object detection system of claim 1, comprising:
- a central pair of streamers;
- at least one auxiliary port side streamer located a first distance from the central pair of streamers; and
- at least one auxiliary port side source, the at least one auxiliary port side source located between the central pair of streamers and the at least one auxiliary port side streamer.

7. The seabed object detection system of claim 1, comprising:
- a central pair of streamers including a central port side streamer and a central starboard side streamer;
- at least one auxiliary port side streamer located a first distance from the central pair of streamers;
- at least one auxiliary starboard side streamer located a second distance from the central pair of streamers opposite the at least one auxiliary port side streamer; and
- at least one auxiliary port side source, the at least one auxiliary port side source located between the central port side streamer and the at least one auxiliary port side streamer.

8. The seabed object detection system of claim 1, comprising:
- a central pair of streamers;
- at least one auxiliary starboard side streamer located a distance from the central pair of streamers; and
- at least one auxiliary starboard side source, the at least one auxiliary starboard side source located between the central pair of streamers and the at least one auxiliary starboard side streamer.

9. The seabed object detection system of claim 1, comprising:
- a central pair of streamers including a central port side streamer and a central starboard side streamer;
- at least one auxiliary port side streamer located a first distance from the central pair of streamers;
- at least one auxiliary starboard side streamer located a second distance from the central pair of streamers opposite the at least one auxiliary port side streamer; and
- at least one auxiliary starboard side source, the at least one auxiliary starboard side source located between the central starboard side streamer and the at least one auxiliary starboard side streamer.

10. The seabed object detection system of claim 1, comprising:
- the source array to generate acoustic waves, the acoustic waves to diffract off of a seabed object.

11. The seabed object detection system of claim 1, comprising:
- a receiver array including a plurality of receivers;
- the source array to generate acoustic waves, the acoustic waves to diffract off of a seabed object; and
- the receiver array to receive diffracted waves originating from the seabed object.

12. A method of seabed object detection, comprising:
providing a source array comprising:
- a central pair of sources;
- an auxiliary port side source; and
- an auxiliary starboard side source;
- wherein the source array towed as part of a first pass defines a first path and the source array towed as part of a second pass defines a second path, the first path interleaved with the second path such that the first path partially overlaps the second path; and locating the auxiliary port side source during the first pass between the auxiliary starboard side source and the central pair of sources during the second pass.

13. The method of claim 12, comprising:
providing a central pair of streamers including a central port side streamer and a central starboard side streamer;
locating an auxiliary port side streamer a first distance from the central pair of streamers; and
locating an auxiliary starboard side streamer a second distance from the central pair of streamers opposite the auxiliary port side streamer.

14. The method of claim 12, comprising:
providing a receiver array including a plurality of receivers disposed on a plurality of streamers; and
receiving, by the receiver array, diffraction data that includes diffracted waves originating from a seabed object and generated from a source shot.

15. The method of claim 12, comprising:
providing a receiver array including a plurality of receivers;
generating, by the source array, acoustic waves to diffract off of a seabed object; and
receiving, by the receiver array, diffracted waves originating from the seabed object.

16. The method of claim 12, comprising:
providing a receiver array including a plurality of receivers disposed on a plurality of streamers, the plurality of streamers including:
- a central pair of streamers including a central port side streamer and a central starboard side streamer;
- an auxiliary port side streamer located a first distance from the central pair of streamers; and
- an auxiliary starboard side streamer located a second distance from the central pair of streamers opposite the auxiliary port side streamer.

17. The method of claim 12, wherein:
the central pair of sources comprise a central port side source and a central starboard side source.

18. The method of claim 12, comprising:
providing a central pair of streamers including a central port side streamer and a central starboard side streamer; and
locating the central pair of sources including a central port side source and a central starboard side source between the central pair of streamers, the central port side source located between the central port side streamer and a midline of the central port side streamer and the central starboard side streamer.

19. The method of claim 12, comprising:
providing a central pair of streamers;
locating an auxiliary port side streamer a first distance from the central pair of streamers; and
locating the auxiliary port side source between the central pair of streamers and the auxiliary port side streamer.

20. The method of claim 12, comprising:
providing a central pair of streamers;

locating an auxiliary starboard side streamer a distance from the central pair of streamers; and locating the auxiliary starboard side source between the central pair of streamers and the auxiliary starboard side streamer.

\* \* \* \* \*